United States Patent
Glasco (12)

(10) Patent No.: US 7,103,725 B2
(45) Date of Patent: *Sep. 5, 2006

(54) METHODS AND APPARATUS FOR SPECULATIVE PROBING WITH EARLY COMPLETION AND DELAYED REQUEST

(75) Inventor: David B. Glasco, Austin, TX (US)

(73) Assignee: Newisys, Inc., Austin, TX (US)

( * ) Notice: Subject to any disclaimer, the term of this patent is extended or adjusted under 35 U.S.C. 154(b) by 529 days.

This patent is subject to a terminal disclaimer.

(21) Appl. No.: 10/106,430

(22) Filed: Mar. 22, 2002

(65) Prior Publication Data

US 2003/0182514 A1   Sep. 25, 2003

(51) Int. Cl.
  *G06F 12/08*   (2006.01)
  *G06F 12/16*   (2006.01)

(52) U.S. Cl. ............... 711/141; 711/118; 711/120; 711/128; 711/130; 711/146; 711/147; 711/148; 711/135

(58) Field of Classification Search ........ 711/141–149, 711/130, 135–136, 119–122, 117–118; 710/316–317, 710/100, 315

See application file for complete search history.

(56) References Cited

U.S. PATENT DOCUMENTS

| | | | | |
|---|---|---|---|---|
| 5,195,089 | A | * | 3/1993 | Sindhu et al. ............... 370/235 |
| 6,067,603 | A | * | 5/2000 | Carpenter et al. .......... 711/141 |
| 6,167,492 | A | | 12/2000 | Keller et al. ................. 711/154 |
| 6,292,705 | B1 | * | 9/2001 | Wang et al. .................... 700/5 |
| 6,338,122 | B1 | * | 1/2002 | Baumgartner et al. ...... 711/141 |
| 6,385,705 | B1 | | 5/2002 | Keller et al. ................. 711/154 |
| 6,490,661 | B1 | | 12/2002 | Keller et al. ................. 711/150 |
| 6,615,319 | B1 | * | 9/2003 | Khare et al. ................ 711/141 |
| 6,633,945 | B1 | * | 10/2003 | Fu et al. ..................... 710/316 |
| 6,754,782 | B1 | * | 6/2004 | Arimilli et al. ............. 711/144 |
| 6,760,819 | B1 | * | 7/2004 | Dhong et al. ............... 711/146 |
| 6,799,252 | B1 | * | 9/2004 | Bauman ..................... 711/149 |
| 6,839,808 | B1 | * | 1/2005 | Gruner et al. .............. 711/130 |

OTHER PUBLICATIONS

HyperTransport™ I/O Link Specification Revision 1.03, HyperTransport™ Consortium, Oct. 10, 2001, Copyright © 2001 HyperTransport Technology Consortium.

* cited by examiner

Primary Examiner—Matthew Kim
Assistant Examiner—Zhuo H. Li
(74) Attorney, Agent, or Firm—Beyer Weaver & Thomas, LLP

(57) ABSTRACT

According to the present invention, methods and apparatus are provided for increasing the efficiency of data access in multiple processor, multiple cluster systems. A cache coherence controller associated with a first cluster of processors can determine whether speculative probing can be performed before forwarding a data access request to a second cluster. The cache coherence controller can send the data access request to the second cluster if the data access request can not be completed locally.

51 Claims, 15 Drawing Sheets

METHODS AND APPARATUS FOR SPECULATIVE PROBING WITH EARLY COMPLETION AND DELAYED REQUEST

CROSS-REFERENCE TO RELATED APPLICATIONS

This application is related to concurrently filed U.S. application Ser. No. 10/106,426, entitled METHODS AND APPARATUS FOR SPECULATIVE PROBING AT A REQUEST CLUSTER and to concurrently filed U.S. application Ser. No. 10/106,299, entitled METHODS AND APPARATUS FOR SPECULATIVE PROBING WITH EARLY COMPLETION AND EARLY REQUEST, the disclosures of which are incorporated by reference herein for all purposes.

BACKGROUND OF THE INVENTION

1. Field of the Invention

The present invention generally relates to accessing data in a multiple processor system. More specifically, the present invention provides techniques for improving data access efficiency while maintaining cache coherency in a multiple processor system having a multiple cluster architecture.

2. Description of Related Art

Data access in multiple processor systems can raise issues relating to cache coherency. Conventional multiple processor computer systems have processors coupled to a system memory through a shared bus. In order to optimize access to data in the system memory, individual processors are typically designed to work with cache memory. In one example, each processor has a cache that is loaded with data that the processor frequently accesses. The cache can be onchip or offchip. Each cache block can be read or written by the processor. However, cache coherency problems can arise because multiple copies of the same data can co-exist in systems having multiple processors and multiple cache memories. For example, a frequently accessed data block corresponding to a memory line may be loaded into the cache of two different processors. In one example, if both processors attempt to write new values into the data block at the same time, different data values may result. One value may be written into the first cache while a different value is written into the second cache. A system might then be unable to determine what value to write through to system memory.

A variety of cache coherency mechanisms have been developed to address such problems in multiprocessor systems. One solution is to simply force all processor writes to go through to memory immediately and bypass the associated cache. The write requests can then be serialized before overwriting a system memory line. However, bypassing the cache significantly decreases efficiency gained by using a cache. Other cache coherency mechanisms have been developed for specific architectures. In a shared bus architecture, each processor can check or snoop on the bus to determine whether it can read or write a shared cache block. In one example, a processor only writes an object when it owns or has exclusive access to the object. Each corresponding cache object is then updated to allow processors access to the most recent version of the object.

Bus arbitration can be used when both processors attempt to write the same shared data block in the same clock cycle. Bus arbitration logic can decide which processor gets the bus first. Although, cache coherency mechanisms such as bus arbitration are effective, using a shared bus limits the number of processors that can be implemented in a single system with a single memory space.

Other multiprocessor schemes involve individual processor, cache, and memory systems connected to other processors, cache, and memory systems using a network backbone such as Ethernet or Token Ring. Multiprocessor schemes involving separate computer systems each with its own address space can avoid many cache coherency problems because each processor has its own associated memory and cache. When one processor wishes to access data on a remote computing system, communication is explicit. Messages are sent to move data to another processor and messages are received to accept data from another processor using standard network protocols such as TCP/IP. Multiprocessor systems using explicit communication including transactions such as sends and receives are referred to as systems using multiple private memories. By contrast, multiprocessor system using implicit communication including transactions such as loads and stores are referred to herein as using a single address space.

Multiprocessor schemes using separate computer systems allow more processors to be interconnected while minimizing cache coherency problems. However, it would take substantially more time to access data held by a remote processor using a network infrastructure than it would take to access data held by a processor coupled to a system bus. Furthermore, valuable network bandwidth would be consumed moving data to the proper processors. This can negatively impact both processor and network performance.

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions. However, using a point-to-point architecture to connect multiple processors in a multiple cluster system sharing a single memory space presents its own problems.

Consequently, it is desirable to provide techniques for improving data access and cache coherency in systems having multiple clusters of multiple processors connected using point-to-point links.

SUMMARY OF THE INVENTION

According to the present invention, methods and apparatus are provided for increasing the efficiency of data access in a multiple processor, multiple cluster system. A cache coherence controller associated with a first cluster of processors can determine whether speculative probing can be performed before forwarding a data access request to a second cluster. The cache coherence controller can send the data access request to the second cluster if the data access request can not be completed locally.

According to specific embodiments, a computer system is provided. A first cluster includes a first plurality of processors and a first cache coherence controller. The first plurality of processors and the first cache coherence controller are interconnected in a point-to-point architecture. A second cluster includes a second plurality of processors and a second cache coherence controller. The second plurality of processors and the second cache coherence controller are interconnected in a point-to-point architecture. The first cache coherence controller is coupled to the second cache coherence controller. The first cache coherence controller is configured to receive a cache access request originating from the first plurality of processors and send a probe to the first plurality of processors in the first cluster before the cache access request is received by a serialization point in the second cluster. The first cache coherence controller can be further configured to send the cache access request to the second cluster after receiving a probe response from the first node.

In one embodiment, the serialization point is a memory controller in the second cluster. The probe can be associated with the memory line corresponding to the cache access request. The first cache coherence controller can be further configured to respond to the probe originating from the second cluster using information obtained from the probe of the first plurality of processors. The first cache coherence controller can also be associated with a pending buffer.

The first cache coherence controller can send the cache access request to the second cluster after receiving a probe response from the first node. The first cache coherence controller can send the cache access request after determining that the cache access request can not be completed locally. Whether or not the cache access request can be completed locally may depend on the state of the cache.

According to another embodiment, a cache coherence controller is provided. The cache coherence controller includes interface circuitry coupled to a plurality of local processors in a local cluster and a non-local cache coherence controller in a non-local cluster. The plurality of local processors are arranged in a point-to-point architecture. The cache coherence controller can also include a protocol engine coupled to the interface circuitry. The protocol engine can be configured to receive a cache access request from a first processor in the local cluster and speculatively probe a local node.

According to another embodiment, a method for a cache coherence controller to manage data access in a multiprocessor system is provided. A cache access request is received from a local processor associated with a local cluster of processors connected through a point-to-point architecture. It is determined if speculative probing of a local node associated with a cache can be performed before forwarding the cache request to a non-local cache coherence controller. The non-local cache coherence controller is associated with a remote cluster of processors connected through a point-to-point architecture. The remote cluster of processors shares an address space with the local cluster of processors.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1A:
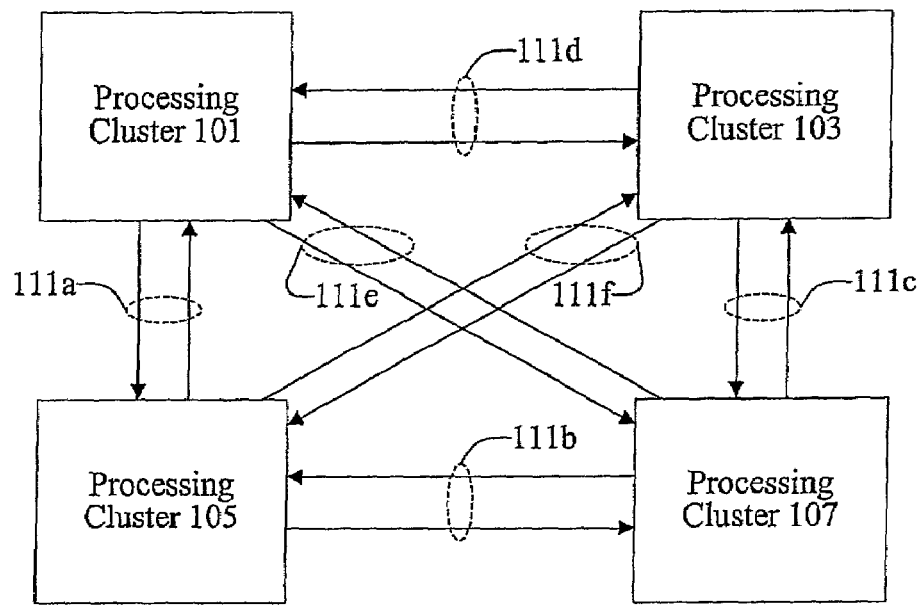
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well known process operations have not been described in detail in order not to unnecessarily obscure the present invention.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of over conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. The memory controller can be configured to serialize the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a single second. Any delay can adversely impact processor performance.

According to various embodiments, speculative probing is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for sending probes to nodes associated with cache blocks before a request associated with the probes is received at a serialization point is referred to herein as speculative probing.

Techniques of the present invention recognize the reordering or elimination of certain data access requests do not adversely affect cache coherency. That is, the end value in the cache is the same whether or not snooping occurs. For example, a local processor attempting to read the cache data block can be allowed to access the data block without sending the requests through a serialization point in certain circumstances. In one example, read access can be permitted when the cache block is valid and the associated memory line is not locked. The techniques of the present invention provide mechanisms for determining when speculative probing can be performed and also provide mechanisms for determining when speculative probing can be completed without sending a request through a serialization point. Speculative probing will be described in greater detail below. By completing a data access transaction within a local cluster, the delay associated with transactions in a multiple cluster system can be reduced or eliminated.

To allow even more efficient speculative probing, the techniques of the present invention also provide mechanisms for handling transactions that may result from speculatively probing a local node before locking a particular memory line. In one example, a cache coherence protocol used in a point-to-point architecture may not allow for speculative probing. Nonetheless, mechanisms are provided to allow various nodes such as processors and memory controllers to continue operations within the cache coherence protocol without knowing that any protocol variations have occurred.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111a–f. In one embodiment, the multiple processors in the multiple cluster architecture shown in FIG. 1A share the same memory space. In this example, the point-to-point links 111a–f are internal system connections that are used in place of a traditional front-side bus to connect the multiple processors in the multiple clusters 101, 103, 105, and 107. The point-to-point links may support any point-to-point coherence protocol.

Figure 1B:
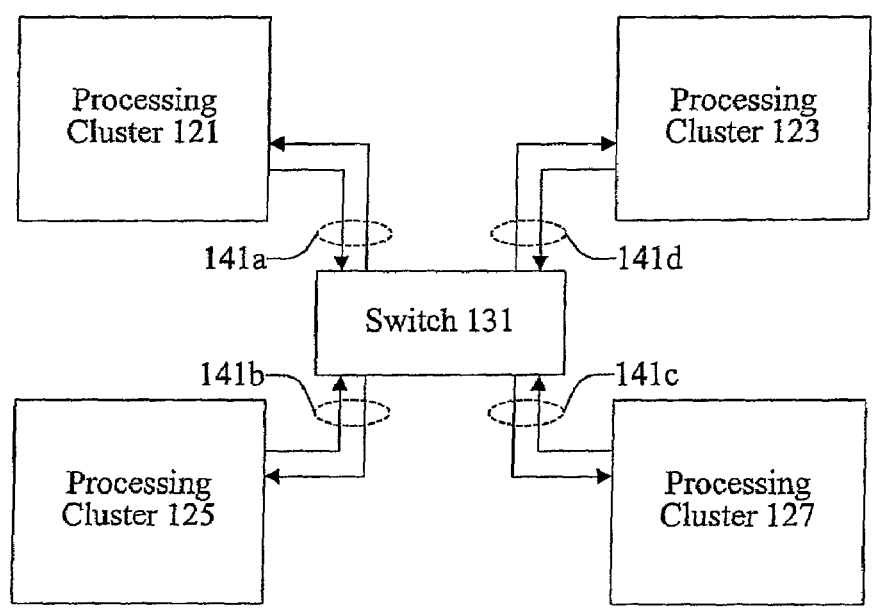

FIG. 1B is a diagrammatic representation of another example of a multiple cluster, multiple processor system that can use the techniques of the present invention. Each processing cluster 121, 123, 125, and 127 can be coupled to a switch 135 through point-to-point links 141a–d. It should be noted that using a switch and point-to-point allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
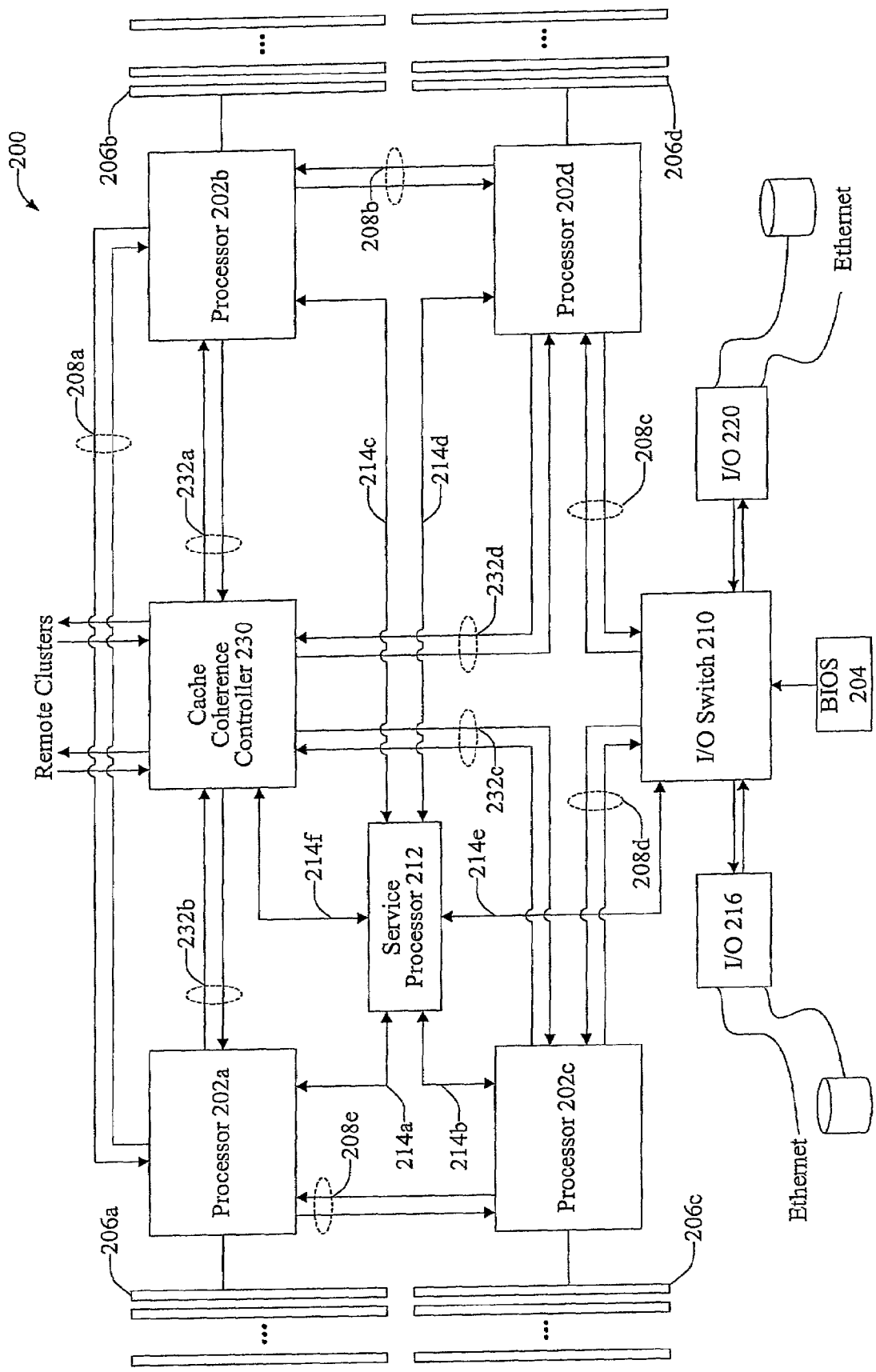
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202a–202d, one or more Basic I/O systems (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and cache coherence controller 230. The service processor 212 is configured to allow communications with processors 202a–202d, I/O switch 210, and cache coherence controller 230 via a JTAG interface represented in FIG. 2 by links 214a–214f. It should be noted that other interfaces are supported. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein. The service processor and computer system partitioning are described in U.S. patent application Ser. No. 09/932,456, titled Computer System Partitioning Using Data Transfer Routing Mechanism, filed on Aug. 16, 2001, the entirety of which is incorporated by reference for all purposes.

The processors 202a–d are also coupled to a cache coherence controller 230 through point-to-point links 232a–d. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206a–206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 can be an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
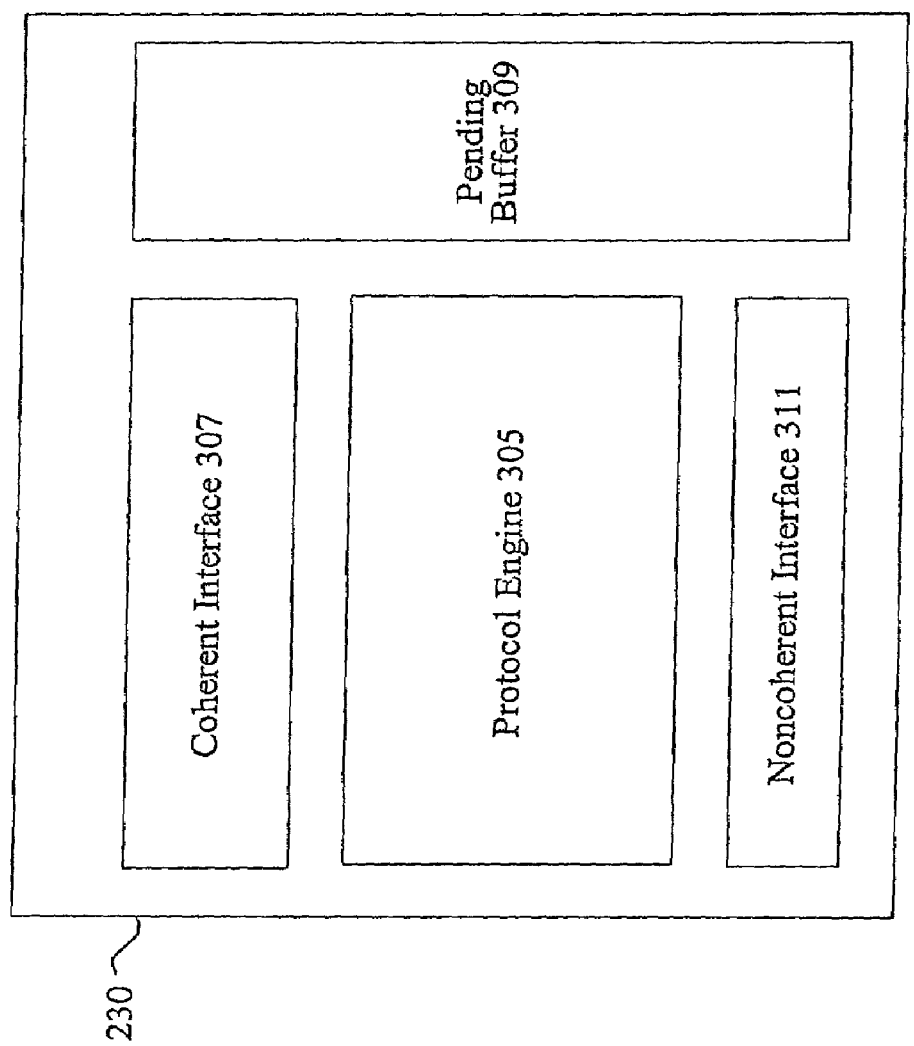
FIG. 3 is a diagrammatic representation of a cache coherence controller.

FIG. 3 is a diagrammatic representation of one example of a cache coherence controller 230. The cache coherence controller can include a protocol engine 305 configured to handle packets such as probes and requests received from processors in various clusters of a multiprocessor system. The functionality of the protocol engine 305 can be partitioned across several engines to improve performance. In one example, partitioning can be done based on individual transactions flows, packet type (request, probe and response), direction (incoming and outgoing), or transactions flow (request flows, probe flows, etc).

The protocol engine 305 has access to a pending buffer 309 that allows the cache coherence controller to track transactions such as recent requests and probes and associated the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
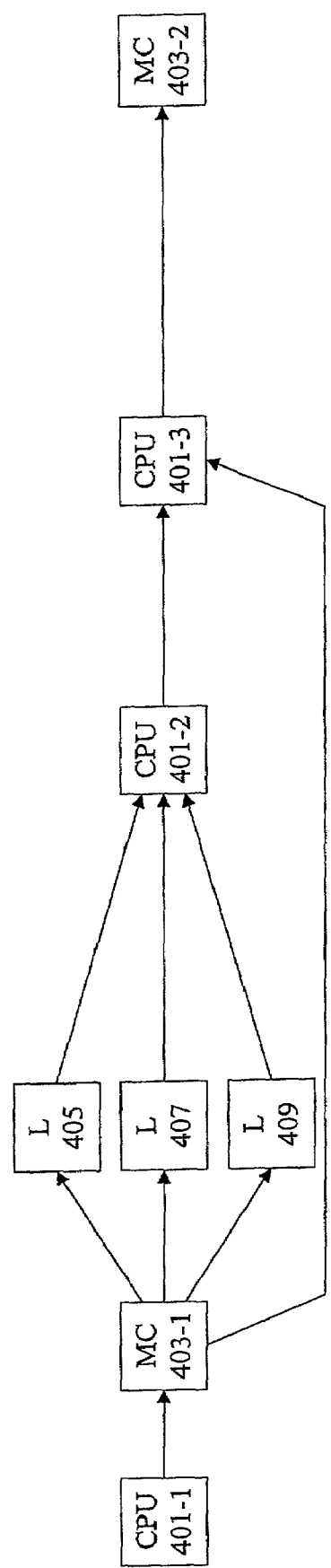
FIG. 4 is a diagrammatic representation showing a transaction flow for a data access request.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To preserve cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A–5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster can communicate with the cache coherence controller as if the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
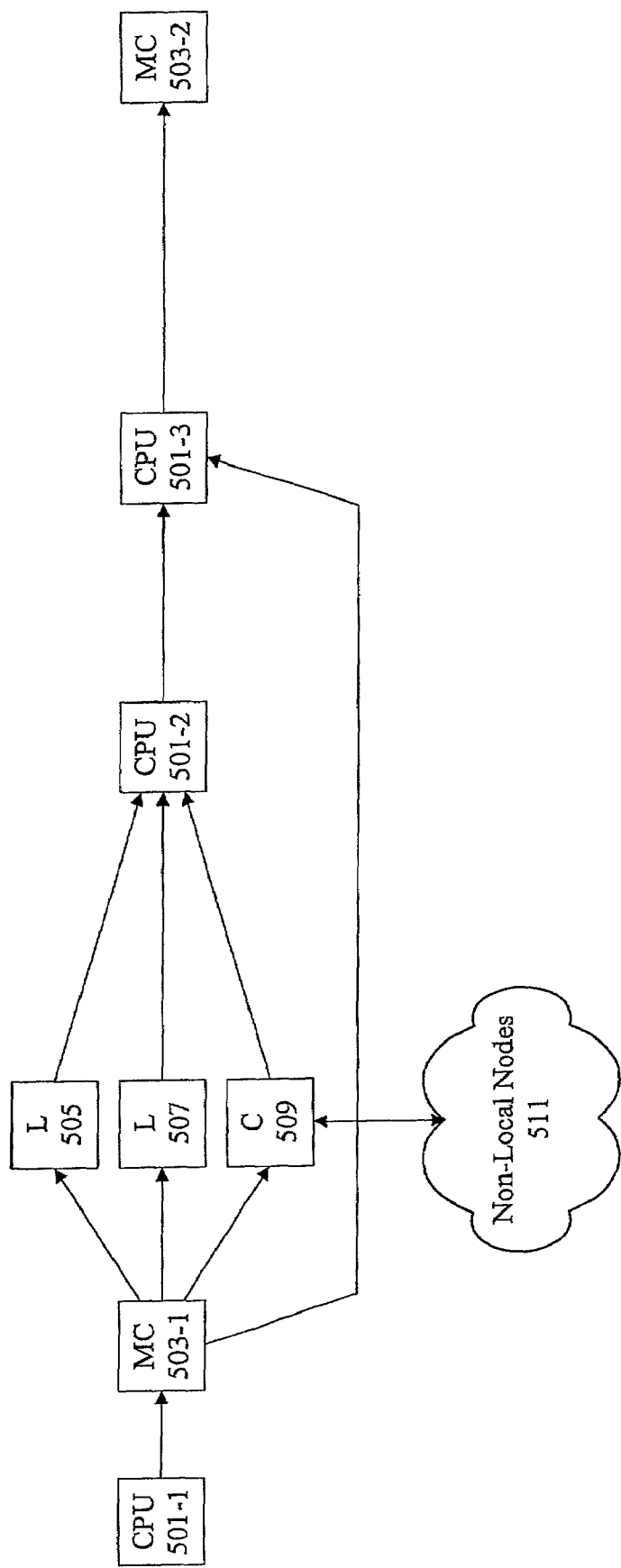
FIG. 5A–5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted thata coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the responses from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
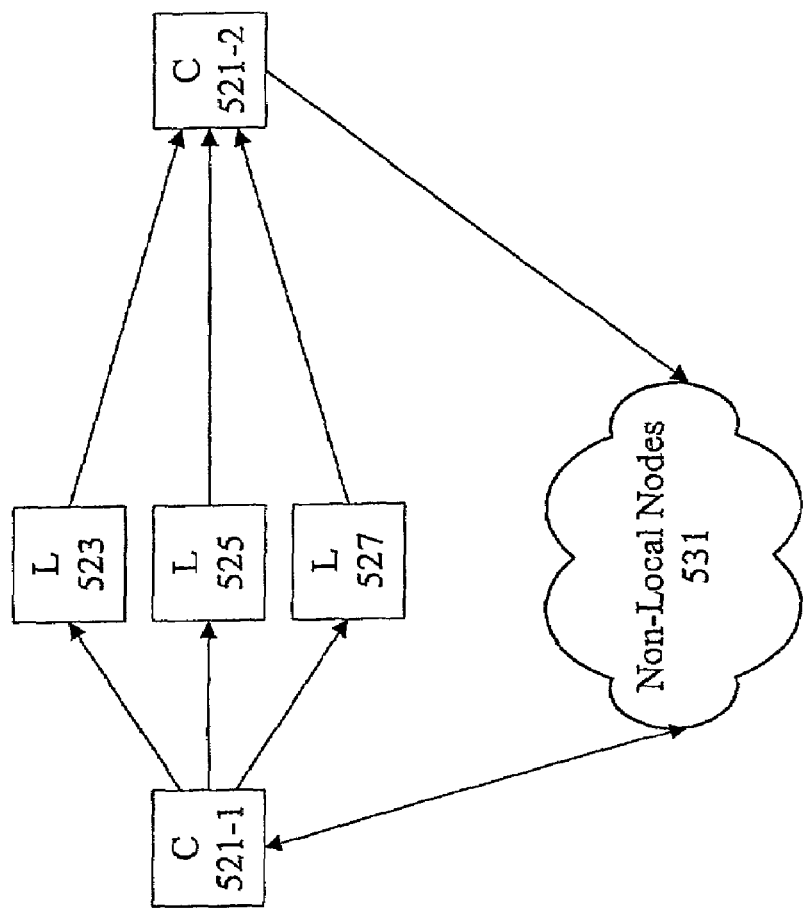

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
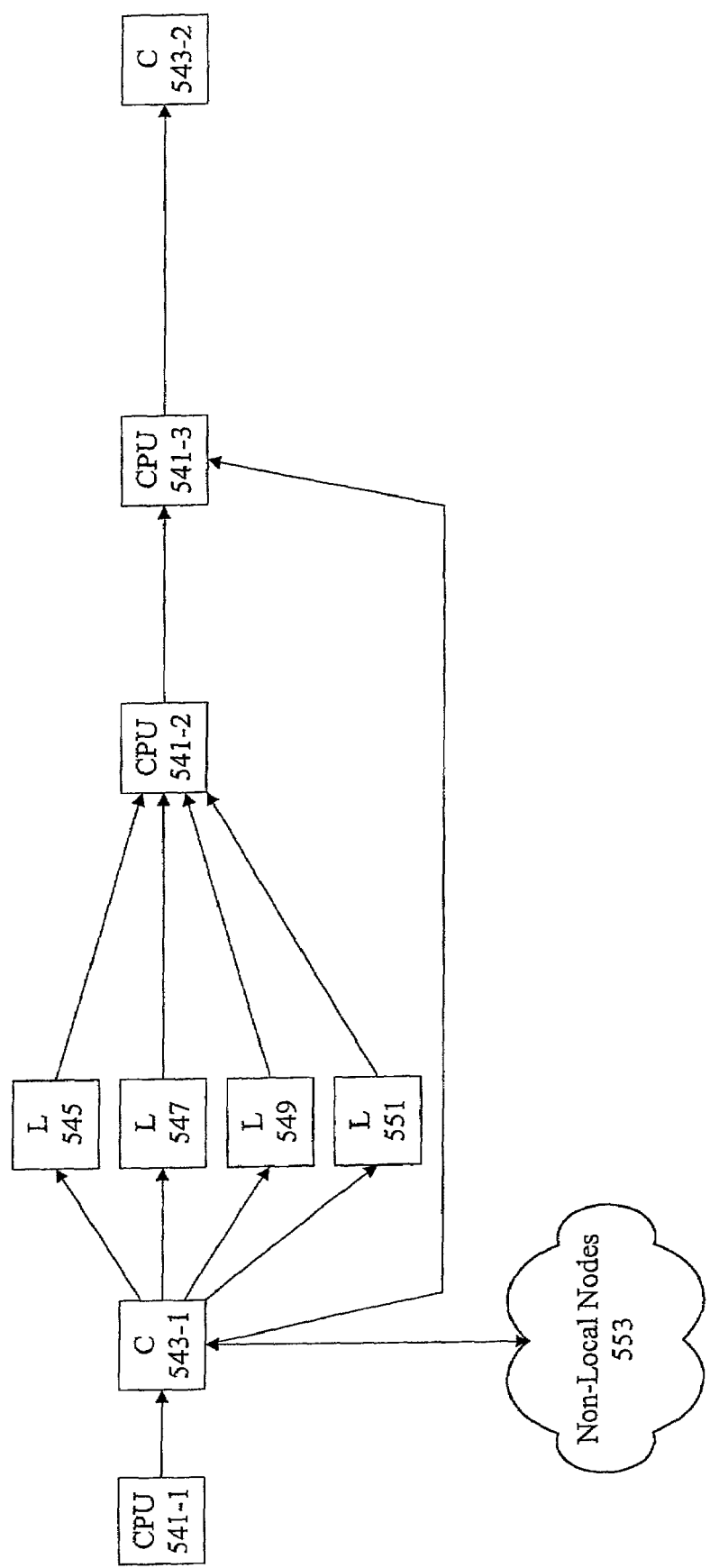

FIG. 5C shows the cache coherence controller acting as a remote memory. When a local processor 541-1 generates an access request that targets remote memory, the cache coherence controller 543-1 forwards the request to the non-local nodes 553. The cache coherence controller 543-1 accepts the requests and forwards it to remote cluster 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller 543-1 also forwards the final processor response to the remote memory controller associated with non-local nodes 553.

Figure 5D:
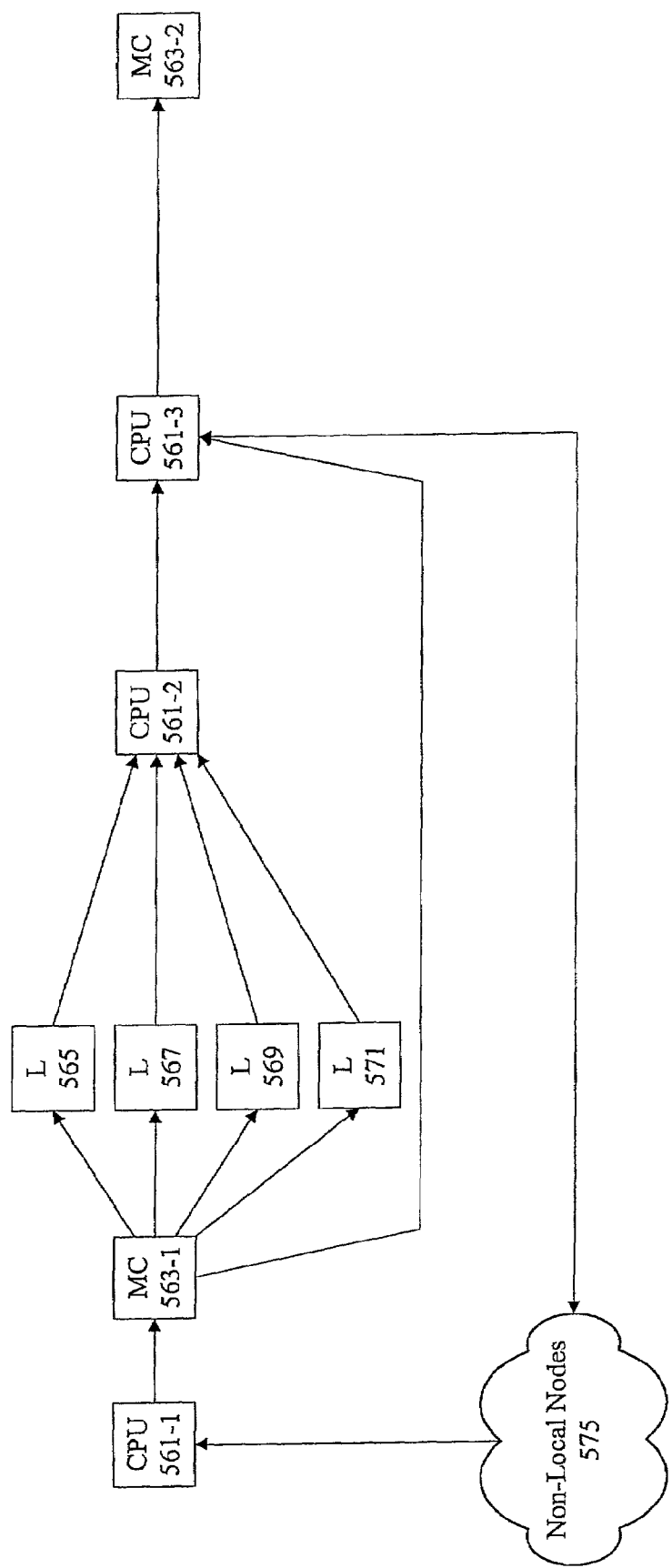

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 5631. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
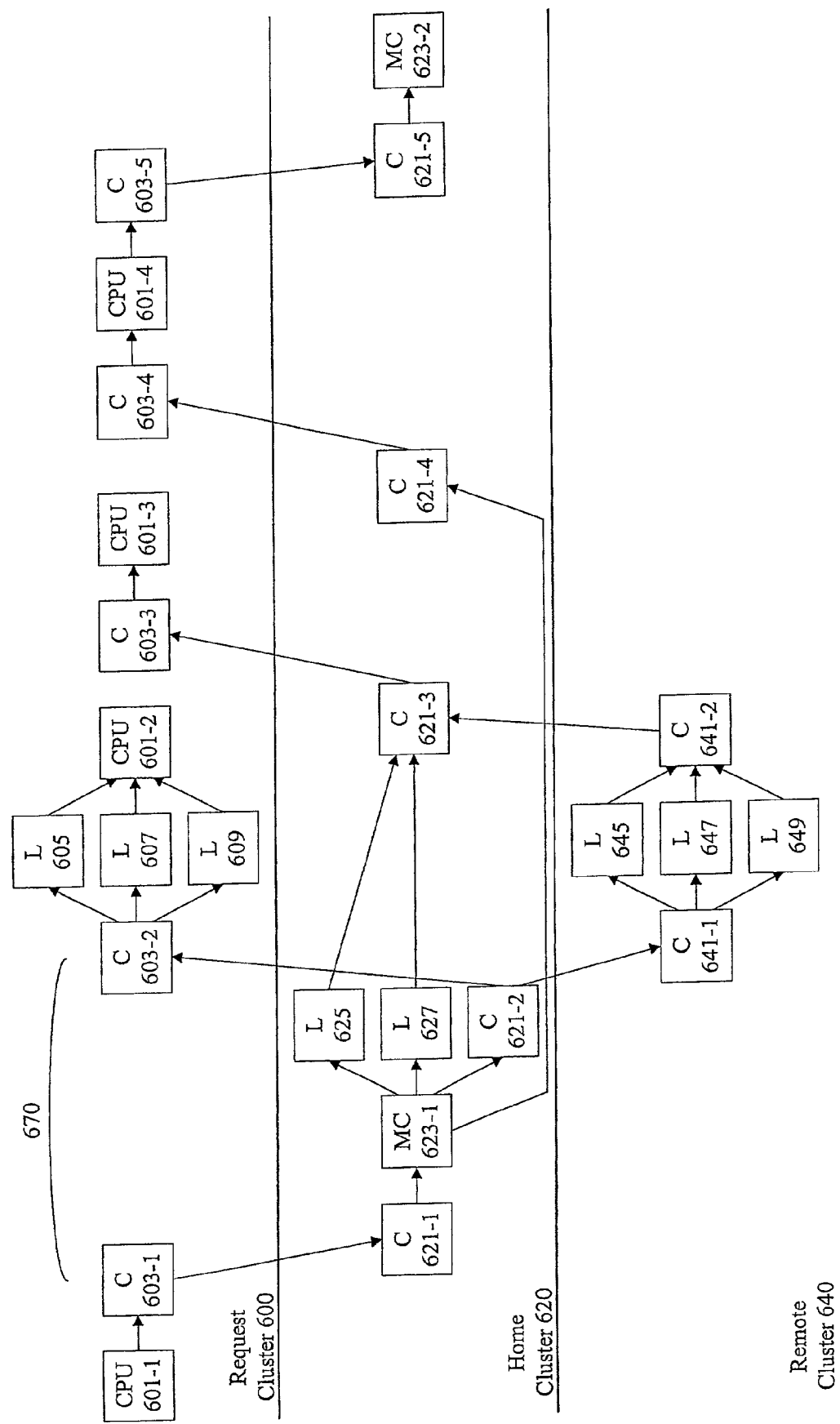
FIG. 6 is a diagrammatic representation depicting a transaction flow for a data access request from a processor transmitted to a home cache coherency controller.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

A processor 601-1 in a local cluster 600 can send a data access request such as a read request to a cache coherence controller 603-1. The cache coherence controller 603-1 can track the transaction in the pending buffer (of FIG. 3) and forward the request to a cache coherence controller 621-1 in a home cluster 620. The cache coherence controller 621-1 at the home cluster 620 receives the access request and tracks the request in its pending buffer. In one example, information associated with the requests can be stored in the pending buffer. The cache coherence controller 621-1 forwards the access request to a memory controller 623-1 also associated with the home cluster 620. At this point, the memory controller 623-1 locks the memory line associated with the request. In one example, the memory line may be a unique address in the memory space shared by the multiple processors in the request cluster 600, home cluster 620, and the remote cluster 640. The memory controller generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 603-1 sends a probe to a memory controller associated with a different cluster, a delay 670 is introduced into the probing of the local nodes 605, 607, and 609. Because the request went from the request cluster 600 to a home cluster 620 and finally back to a request cluster 600, delay due to factors such as latency was introduced. Intercluster traffic increases because of the intercluster messages transmitted to maintain cache coherency. In a single cluster configuration, a processor 601-1 could more directly transmit probes to local nodes associated with cache blocks 605, 607, and 609. An example of the single cluster transaction sequence is demonstrated in FIG. 5. However, in a multiple cluster architecture, a coherent protocol may specify that a request be transmitted to a serialization point in a home cluster 620 before the local cache blocks can be probed. In various embodiments, the delay 670, added traffic, and processing overhead can be substantial. According to various embodiments of the present invention, techniques are provided for reducing or eliminating the delay 670 as well as the network and processing overhead associated with probing local nodes associated with cache blocks in a multiple cluster architecture.

As will be appreciated by one of skill in the art, the specific transactions sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A–5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640.

As noted above, using a multiple cluster architecture can introduce delay as well as other undesirable elements such as increased traffic and processing overhead because a request is routed from a request cluster 600 to a home cluster 620 before local nodes are probed.

Figure 7:
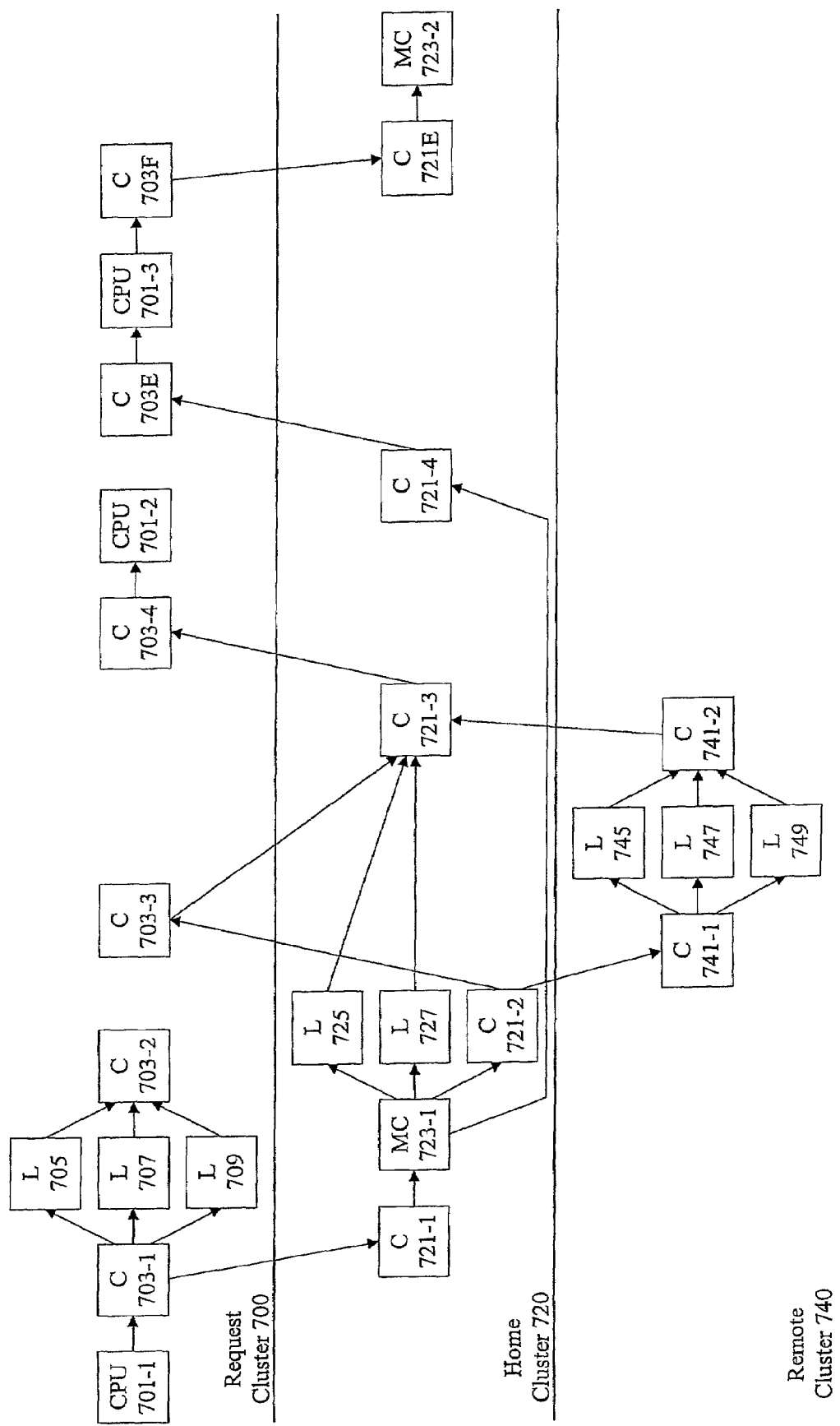
FIG. 7 is a diagrammatic representation showing a transaction flow for speculative probing at a request cluster.

FIG. 7 is a diagrammatic representation showing one example of a mechanism for reducing data access delay associated with multiple cluster architectures. The processor 701-1 sends a request to a cache coherence controller 703-1. Instead of merely forwarding the request from the request cluster 700 to a cache coherence controller 721-1 associated with a home cluster 720, the cache coherence controller 703-1 can also send probes to local nodes associated with cache block 705, 707, and 709 before locking the memory line associated with the request. In other words, cache coherence controller 703-1 can speculatively probe local nodes. As noted above, any mechanism for sending probes to local nodes associated with cache blocks before a request associated with the probes is received at a serialization point is referred to herein as speculative probing. It should be noted that speculative probing can mean that local nodes are probed before the associated memory line is locked.

The cache coherence controller 721-1 forwards the request to memory controller 723-1. The memory controller 723-1 then proceeds to lock the memory line associated with the request and sends probes to nodes associated with cache blocks. Cache coherence controller 721-2 sends a probe to cache coherence controller 703-3 at request cluster 700 as well as a probe to cache coherence controller 741-1 at remote cluster 740. Because speculative probing has been performed, the cache coherence controller 703-3 can immediately send a probe response to cache coherence controller 721-3. This is one example of a transaction that can improve the response time for data access requests in a multiple cluster system. The transaction flow can then proceed as depicted in FIG. 6. However, the probing at the request cluster might not be complete when the probe is received at 703-3. The cache coherence controller may have to wait until it receives responses from cache blocks 705, 707, and 709.

However, cache coherence controller 703-1 cannot always speculatively probe. In one example, the memory line associated with the request from the processor 701-1 may already be locked from probes generated at request cluster 700. The cache coherence controller 703-1 can determine whether a memory line is already locked by looking into its pending buffer. Any logic or mechanism for storing information associated with transactions handled by a cache coherence controller is referred to herein as the pending buffer. If the memory line is locked based on information from the pending buffer, speculative probing cannot be performed because another processor is accessing the memory line. Accessing a cache block associated with a locked memory line can lead to detrimental effects including cache inconsistencies and system faults. However, if the cache coherence controller 703-1 determines that speculative probing can proceed, then the cache coherence controller 703-1 can probe the local nodes.

If the cache coherence controller 703-1 proceeds with speculative probing of a particular memory line but another processor is able to send an intervening request to memory controller 723-1 to lock the memory line before the cache coherence controller 703-1 can lock the memory line, the cache coherence controller can use the information from its speculative probe to respond to the intervening probes. More specifically, another processor may send a request to memory controller 723-1 to lock the desired memory after cache coherence controller 703-1 has sent probes to local nodes but before the memory controller 723-1 locks the memory line for the processor 701-1.

Figure 8:
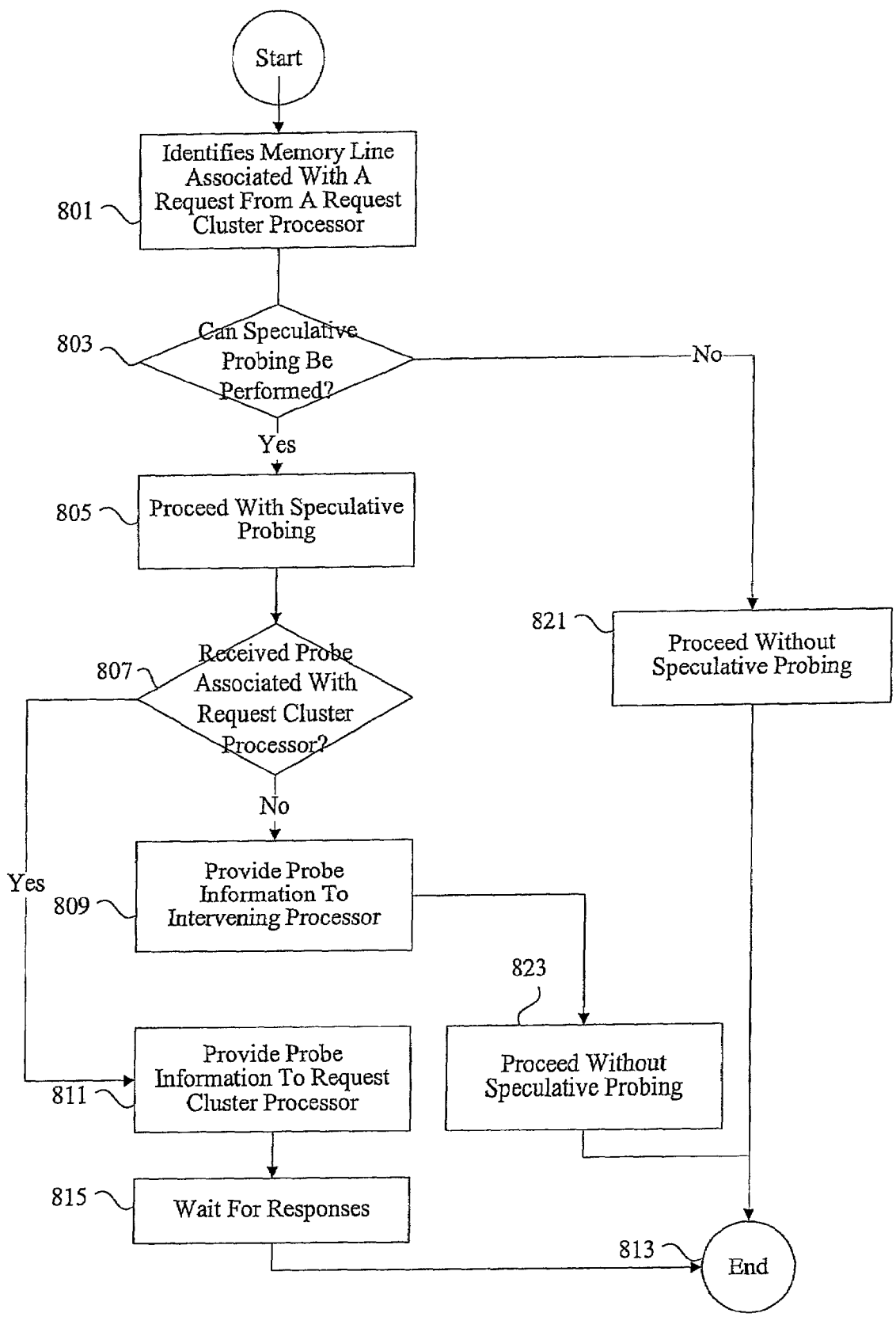
FIG. 8 is a process flow diagram depicting the handling of intervening requests.

FIG. 8 is a process flow diagram providing more information on handling speculative probing. According to various embodiments, a cache coherence controller at a request cluster identifies the memory line associated with an outgoing request from a request cluster processor at 801. If the cache coherence controller determines that the memory line is currently being probed at 803, the transaction can continue without speculative probing at 821 as shown in FIG. 6. The cache coherence controller can determine if the memory line is currently being probed in the local cluster by referencing its pending buffer. The pending buffer may indicate that another processor in any cluster is currently accessing the memory line. However, if the cache coherence controller determines that the memory line is not currently being probed, the cache coherence controller can proceed with speculative probing at 805 as shown in FIG. 7.

A cache coherence controller at a request cluster can then expect to receive a probe triggered by a memory controller from a home cluster. The probe may have resulted from the request cluster processor, or the probe may have resulted from an intervening processor. A probe request from an intervening processor may result when an intervening processor is able to send a request to lock the desired memory line before the originating processor is able to lock the same line. To handle an intervening processor, the cache coherence controller at the request cluster determines whether the probe is associated with the request cluster processor at 807. In one example, the cache coherence controller can determine whether the probe is associated with the request cluster processor by looking at the source identifier or the transaction identifier maintained in its pending buffer. If the cache coherence controller determines at 807 that the probe is not from the request cluster processor, the probe response information is provided to the intervening processor at 809.

At 811, information is provided to the request cluster processor. At 815, the cache coherence controller may have to wait for responses from the various cache blocks before completing at 813. At 823, the transaction can continue without speculative probing. The cluster would subsequently receive the probe for the associated request, which can be processed as shown in FIG. 6. In one example, the probe information is also maintained in its pending buffer. When the controller receives a probe from the request cluster processor, the probe information is provided at 811 to the originating processor and the probe information can be cleared. Again, it should be noted that at 811, the cache coherence processor may have to wait for responses at 815 from the various cache blocks before completing at 813.

A number of techniques for associating a processor with a probe are available. In one example, a centralized pending buffer can be used for maintaining information on various processors and their associated transactions. In another example, any memory can be used to maintain speculative probe information.

Speculative probing as shown in FIG. 7 and FIG. 8 allows local nodes associated with cache to be probed before a home node memory controller locks the associated memory line. This can decrease or eliminate delay resulting from a multicluster architecture. That is, local nodes can be probed before a request is routed through a remote cluster and back to the request cluster. In certain circumstances, delay, network traffic, and processing overhead can be reduced by allowing local requests to complete before sending a request to a home cluster.

Figure 9:
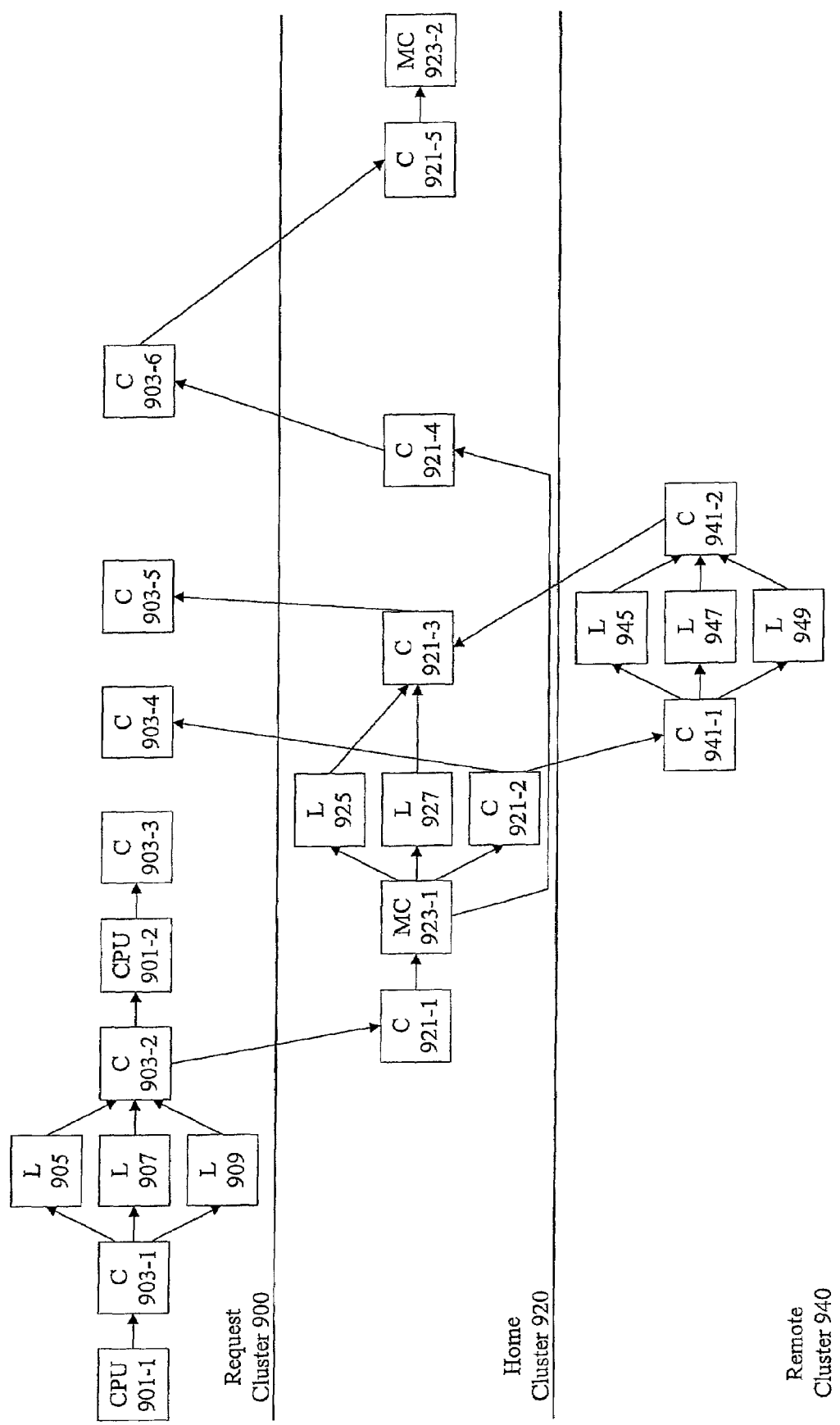
FIG. 9 is a diagrammatic representation showing a transaction flow for speculative probing with delayed request.

FIG. 9 is a diagrammatic representation depicting transactions for speculative probing with delayed request. Speculative probing local nodes before sending a request to a home cluster can further increase data access efficiency. According to various embodiments, a processor 901-1 sends a request to cache coherence controller 903-1. Cache coherence controller 903-1 sends probes to local nodes associated with cache blocks 905, and 907, and 909. It should be noted that the cache coherence controller 903-1 does not send a request to the home cluster 920 at this point. The local nodes send probe responses to cache coherence controller 903-2. The cache coherence controller 903-2 determines whether the transaction can be completed locally. If the transaction can be completed locally, no request is sent to cache coherence controller 921-1, and information is sent to CPU 901-2 and completion occurs at 903-3. If the transaction can not be completed locally, the cache coherence controller 903-2 sends a request to cache coherence controller 921-1 associated with home cluster 920.

The request is forwarded to the memory controller 923-1 which sends probes to local nodes as well as cache coherence controller 921-2. It should be noted that the chance of an intervening transaction occurring during speculative probing with delayed request can be greater than the chance of an intervening transaction occurring during speculative probing as shown in FIG. 7. The increased chance results from the longer period of time elapsed before a memory controller 923-1 can lock the memory line. Instead of sending a request to lock the memory line before speculatively probing local nodes, a request to lock the memory line is sent after probe response from local nodes are received.

Allowing a cache access request to complete locally provides significant benefits with respect to data access times and decreased traffic along point-to-point links between processors and clusters of processors. Furthermore, processors and cache coherence controllers of other clusters are not given the added overhead of processing requests, probes, responses, etc. Where a transaction cannot complete locally, a cache coherence controller 921-2 then sends probes to cache coherence controller 903-4 of request cluster 900 and cache coherence controller 941-1 of remote cluster 940. The transaction flow can then proceed as described in FIG. 7.

Figure 10:
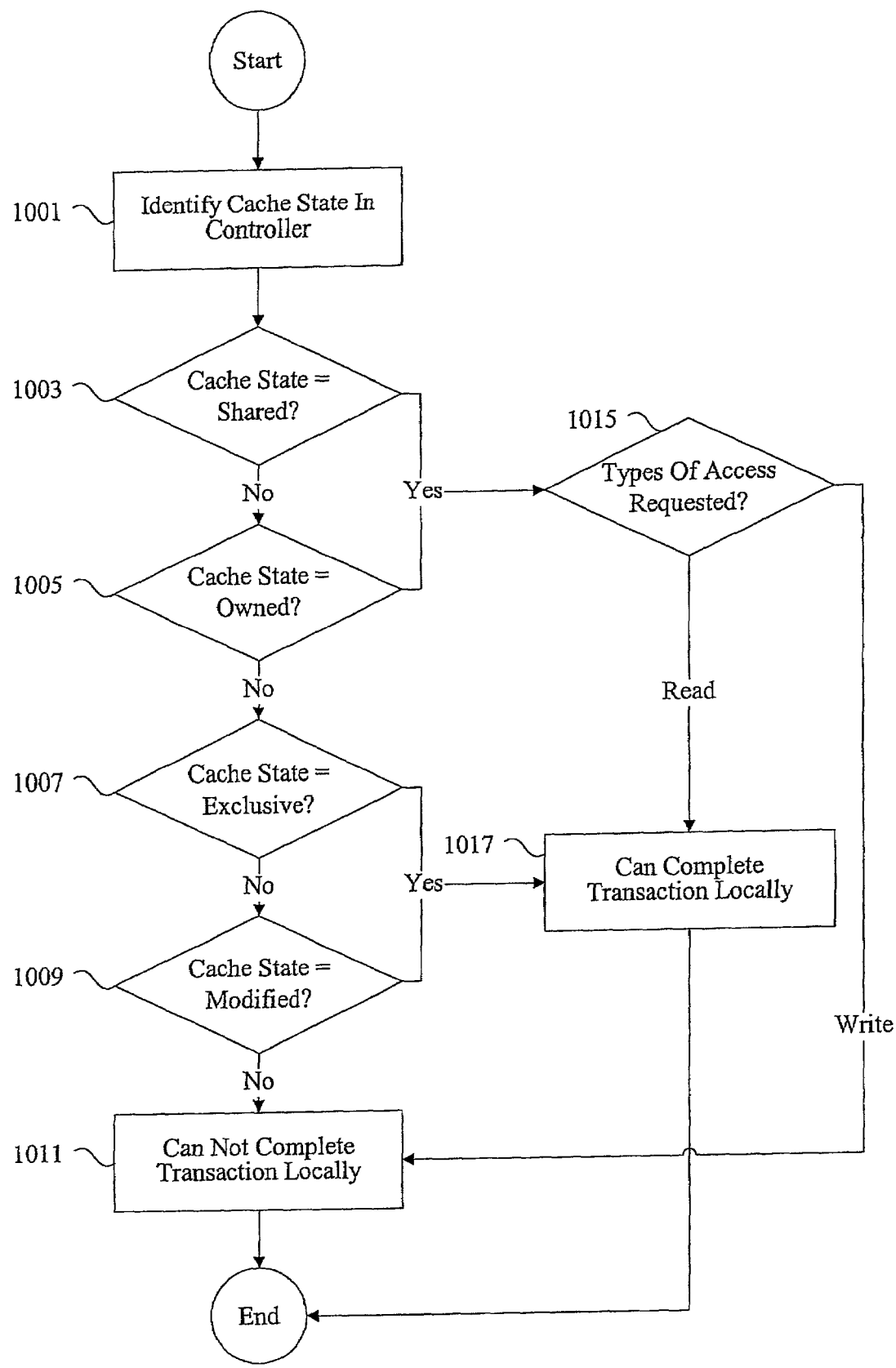
FIG. 10 is a process flow diagram depicting the determination of whether a data access request can complete locally.

FIG. 10 is a flow process diagram depicting a cache coherence controller determining whether a transaction can be completed locally. As noted above, completing a transaction locally can decrease overhead associated with a cache request. As will be appreciated by one of skill in the art, certain types of transactions can be completed without regard to the states of other corresponding cache blocks. In other words, certain cache access requests do not need to probe other nodes. For example, if the data access request is a simple read, a transaction can be completed locally if it is determined that the copy in cache is a valid copy. In this example, no request needs to be sent to other clusters to probe different nodes associated with cache blocks. In another example, if the data access request is a write, it is less likely that a transaction can be completed locally.

According to various embodiments, a cache coherence controller identifies the cache state associated with a particular requested memory line at 1001. If it can be determined specifically that the cache block is in a shared state at 1003 or the cache block is in an owned state at 1005, it is then determined what type of access has been requested at 1015. If the type of access request is a read, the transaction can be completed locally at 1017. If the type of access request is a write, the transaction can not be completed locally at 1011 and a request is sent to a home cluster cache coherence controller. If it is determined at 1007 that the cache is specifically in an exclusive state or a modified state, the transaction can be completed locally at 1017. Otherwise, the cache state may be invalid or indeterminate and the transaction can not be completed locally. It should be noted that certain protocols do not provide enough information for distinguishing the various states. For example, a coherent protocol may only provide enough information for distinguishing three possible states. More specifically, only enough information is provided to determine whether the cache state is invalid, shared or exclusive, or owned or modified.

A coherent protocol may not provide enough information to distinguish between shared or modified and exclusive or owned. Without being able to distinguish between the states, a read transaction can still be completed locally because the protocol provides enough information to indicate that a local cache is not in the invalid state. However, a write transaction can not be completed locally because it can not be specifically determined that the cache is in an owned or modified state. It should be appreciated that a number of other protocol variations are contemplated. In one example, a cache coherence protocol may not have an owned state. A cache may only be allowed to have a modified, exclusive, shared, or invalid state. In other examples, the protocol may only be able to distinguish between invalid and valid cache states. In this example, only read transactions are allowed when the cache state is valid. As will be appreciated by one of skill in the art, an accurate determination can be made with available state information as to whether a cache access transaction can be completed locally.

The techniques of the present invention provide mechanisms for speculatively probing local nodes and for determining when speculative probing can be performed. Speculative probing allows a reduction or elimination of the delay and overhead associated with transmitting a request through a home cluster and back to the request cluster. According to other embodiments, a request may only be sent through the home cluster when speculative probing can not be completed locally. Techniques for determining when speculative probing can be completed locally are also provided. However, as noted above, speculatively probing before sending a request to a home cluster can lead to an increase in the number of intervening transactions. That is, more time elapses before the request cluster processor can effectively lock the desired memory line. Nonetheless, speculative probing with the possibility of early completion can significantly reduce the amount of time and resources consumed for data access.

Figure 11:
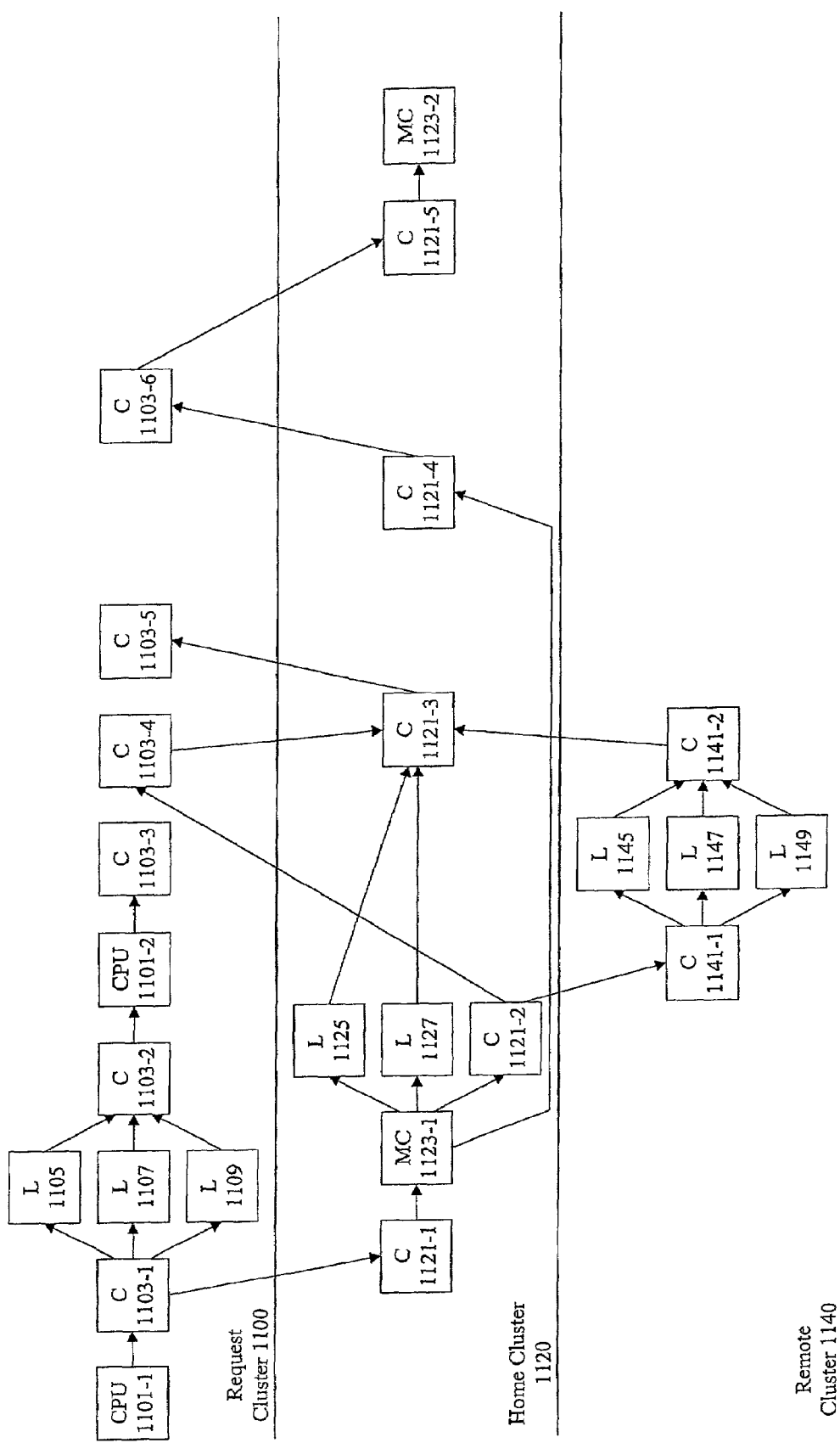
FIG. 11 is a diagrammatic representation showing a transaction flow for speculative probing with early request.

FIG. 11 is a diagrammatic representation depicting transactions for speculatively probing with the possibility of early completion while also transmitting a request to a home cluster to lessen the number of possible intervening transactions. A processor 1101-1 at request cluster 1100 sends a request to a cache coherence controller 1103-1. Cache coherence controller 1103-1 sends probes to local nodes associated with cache blocks 1105, 1107, 1109 and also sends a request to cache coherence controller 1121-1 of home cluster 1120. Cache coherence controller 1121-1 then sends a request to memory controller 1123-1. The memory controller 1123-1 then locks the memory line associated with the request.

It should be noted that intervening transactions can be handled as described in FIG. 8. The memory controller 1123-1 can send probes to nodes associated with cache blocks 1125 and 1127 as well as the cache coherence controller 1121-2. Cache coherence controller at the request cluster 1100 receives probe responses and can determine if the transaction can be completed locally. The determination can be made as shown in FIG. 10 above. In conventional implementations, as soon as a transaction has completed at the request cluster 1100, the cache coherence controller 1103-3 can release the identifier associated with the transaction that is sent to home cluster 1120. The processor 1101 could reuse the identifier. The identifier can then be used for subsequent transactions. In this case, however, the transaction can not yet be released because the cache coherence controller at the request cluster 1100 is still expecting responses and probes from the home cluster.

Figure 12:
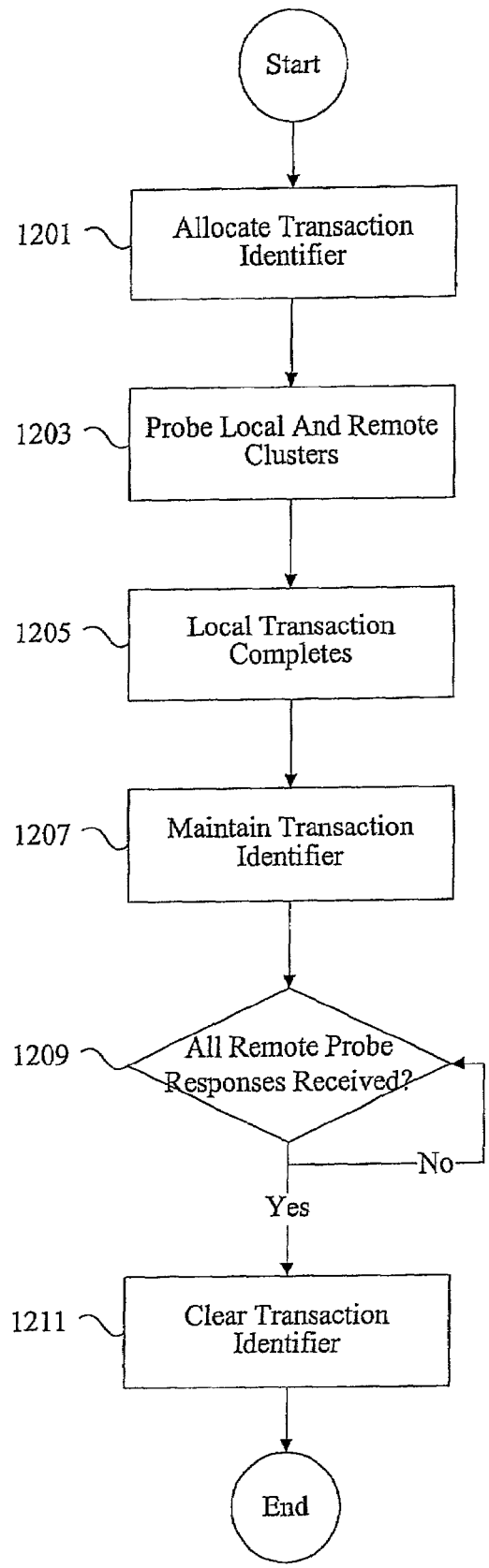
FIG. 12 is a process flow diagram depicting the maintenance of transaction information.

FIG. 12 is a process flow diagram showing the maintenance of transaction identifier information to allow speculative probing with early completion and early request. That is, a request to the home cluster can be sent at the same time local nodes are probed. Early completion and early request allows for reduced delay limits the likelihood of intervening transactions. At 1201, a transaction identifier is allocated when a request is received. At 1203, the cache coherence controller probes local nodes and sends a request to a home cache coherence controller. At 1205, the local transaction completes. It should be noted that in certain circumstances the local transaction may not complete. For example, the local transaction may not complete if the cache block is not in the proper state or does not contain the desired data. If the local transaction completes at 1205, the requesting processor receives the fetch data. Whether or not the local transaction completes at 1207, the transaction identifier can be maintained. In one embodiment, the transaction identifier is maintained in the pending buffer. At 1209, the cache coherence controller waits for all transactions associated with the transaction identifier. It should be appreciated that the cache coherence controller can identify what other processors reside in the system. When all other transactions have been received at 1209, the transaction identifier is cleared at 1211 to allow subsequent transactions to use the same identifier.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a multiple processor clusters connected through a point-to-point, switch, or bus architecture. In another example, multiple clusters of processors may share a single cache coherence controller, or multiple cache coherence controller can be used in a single cluster. Therefore, the scope of the invention should be determined with reference to the appended claims.

What is claimed is:

1. A computer system, comprising:
a first cluster including a first plurality of processors and a first cache coherence controller, the first plurality of processors and the first cache coherence controller interconnected in a point-to-point architecture;
a second cluster including a second plurality of processors and a second cache coherence controller, the second plurality of processors and the second cache coherence controller interconnected in a point-to-point architecture, the first cache coherence controller coupled to the second cache coherence controller;
wherein the first cache coherence controller is configured to receive a cache access request originating from the first plurality of processors and send a probe to the first plurality of processors in the first cluster before the cache access request is received by a serialization point in the second cluster and wherein the first cache coherence controller is further configured to send the cache access request to the second cluster after receiving a probe response from the first cluster.

2. The computer system of claim 1, wherein the first cache coherence controller sends the cache access request after determining that the cache access request can not be completed locally.

3. The computer system of claim 2, wherein the cache access request can be completed locally if the cache access request is a read and the state of the cache corresponding to the cache access request is valid.

4. The computer system of claim 3, wherein the cache access request can be completed locally if the cache access request is a write and the state of the cache corresponding to the cache access request is valid and exclusive.

5. The computer system of claim 3, wherein the cache access request can be completed locally if the cache access request is a write and the state of the cache corresponding to the cache access request is valid and owned.

6. The computer system of claim 1, wherein the memory access serialization point is a memory controller in the second cluster.

7. The computer system of claim 1, wherein the first cache coherence controller is further configured to receive a probe originating from the second cluster.

8. The computer system of claim 7, wherein the probe is associated with the memory line corresponding to the cache access request.

9. The computer system of claim 8, wherein the first cache coherence controller is further configured to respond to the probe originating from the second cluster using information obtained from the probe of the first plurality of processors.

10. A computer system, comprising:
a first cluster including a first plurality of processors and a first cache coherence controller, the first plurality of processors and the first cache coherence controller interconnected in a point-to-point architecture;
a second cluster including a second plurality of processors and a second cache coherence controller, the second plurality of processors and the second cache coherence controller interconnected in a point-to-point architecture, the first cache coherence controller coupled to the second cache coherence controller and constructed to receive a cache access request originating from the first plurality of processors, send a probe to the first plurality of processors, receive responses to the probe, and send the cache access request to the second cluster after the responses to the probe have been received.

11. A cache coherence controller, the cache coherence controller comprising:
interface circuitry coupled to a plurality of local processors in a local cluster and a non-local cache coherence controller in a non-local cluster, wherein the plurality of local processors are arranged in a point-to-point architecture;
a protocol engine coupled to the interface circuitry, the protocol engine configured to receive a cache access request from a first processor in the local cluster and speculatively probe a local node, wherein the protocol engine is configured to send the cache access request to the non-local cache coherence controller in the non-local cluster after receiving a probe response from the local node associated with the cache.

12. The cache coherence controller of claim 11, wherein the protocol engine sends the cache access request after determining that the cache access request can not be completed locally.

13. The cache coherence controller of claim 12, wherein the cache access request can be completed locally if the cache access request is a read and the state of the cache corresponding to the cache access request is valid.

14. The cache coherence controller of claim 13, wherein the cache access request can be completed locally if the cache access request is a write and the state of the cache corresponding to the cache access request is valid and exclusive.

15. The cache coherence controller of claim 13, wherein the cache access request can be completed locally if the cache access request is a write and the state of the cache corresponding to the cache access request is valid and owned.

16. The cache coherence controller of claim 11, wherein the memory access serialization point is a memory controller in the non-local cluster.

17. The cache coherence controller of claim 11, further comprising determining if speculative probing of the local node can be performed.

18. The cache coherence controller of claim 17, wherein determining if speculative probing can be performed comprises verifying that a memory line associated with the cache access request is not locked.

19. The cache coherence controller of claim 18, wherein the protocol engine is further configured to receive a probe originating from a second processor, wherein the probe is associated with the memory line corresponding to the cache access request.

20. The cache coherence controller of claim 19, wherein the protocol engine is further configured to respond to the probe originating from the second processor using information obtained from the speculative probe of the local node.

21. The cache coherence controller of claim 20, further comprising a pending buffer coupled to the protocol engine.

22. The cache coherence controller of claim 21, wherein the protocol engine responds to the probe originating from the second processor by using probe information in the pending buffer.

23. The cache coherence controller of claim 22, wherein the cache coherence controller is configurable as an aggregate remote cache, a probing agent pair, a remote memory and/or as a remote processor.

24. The cache coherence controller of claim 22, wherein the protocol engine, local processors, and non-local processors support a coherence protocol.

25. The cache coherence controller of claim 24, wherein the local cache coherence controller is coupled to the non-local cache coherence controller through a point-to-point architecture.

26. The cache coherence controller of claim 24, wherein the local cache coherence controller is coupled to the non-local cache coherence controller through a switch architecture.

27. A method for a cache coherence controller to manage data access in a multiprocessor system, the method comprising:
   receiving a cache access request from a local processor associated with a local cluster of processors connected through a point-to-point architecture;
   determining if speculative probing of a local node associated with a cache can be performed before forwarding the cache access request to a non-local cache coherence controller, the non-local cache coherence controller associated with a remote cluster of processors connected through a point-to-point architecture, wherein the remote cluster of processors shares an address space with the local cluster of processors
   sending the cache access request to the non-local cache coherence controller after receiving a probe response from the local node associated with the cache.

28. The method of claim 27, wherein the cache access request is sent after determining that the cache access request can not be completed locally.

29. The method of claim 28, wherein the cache access request can be completed locally if the cache access request is a read and the state of the cache corresponding to the cache access request is valid.

30. The method of claim 29, wherein the cache access request can be completed locally if the cache access request is a write and the state of the cache corresponding to the cache access request is valid and exclusive.

31. The method of claim 29, wherein the cache access request can be completed locally if the cache access request is a write and the state of the cache corresponding to the cache access request is valid and owned.

32. The method of claim 27, wherein speculatively probing the local node comprises sending a probe to the local node before a memory line associated the probe is locked.

33. The method of claim 27, wherein the memory access serialization point is a memory controller in the non-local cluster.

34. The method of claim 33, wherein determining if speculative probing can be performed comprises verifying that a memory line associated with the cache access request is not locked.

35. The method of claim 34, further comprising receiving a probe originating from a second processor, wherein the probe is associated with the memory line corresponding to the cache access request.

36. The method of claim 35, further comprising responding to the probe originating from the second processor using information obtained from the speculative probe of the local node.

37. An apparatus for managing data access in a multiprocessor system, the apparatus comprising:
   means for receiving a cache access request from a local processor associated with a local cluster of processors connected through a point-to-point architecture;
   means for determining if speculative probing of a local node associated with a cache can be performed before forwarding the cache access request to a non-local cache coherence controller, the non-local cache coherence controller associated with a remote cluster of processors connected through a point-to-point architecture, wherein the remote cluster of processors shares an address space with the local cluster of processors
   means for sending the cache access request to the non-local cache coherence controller after receiving a probe response from the local node associated with the cache.

38. The apparatus of claim 37, wherein the cache access request is sent after determining that the cache access request can not be completed locally.

39. The apparatus of claim 38, wherein the cache access request can be completed locally if the cache access request is a read and the state of the cache corresponding to the cache access request is valid.

40. The apparatus of claim 39, wherein the cache access request can be completed locally if the cache access request is a write and the state of the cache corresponding to the cache access request is valid and exclusive.

41. The apparatus of claim 39, wherein the cache access request can be completed locally if the cache access request is a write and the state of the cache corresponding to the cache access request is valid and owned.

42. The apparatus of claim 37, wherein speculatively probing the local node comprises sending a probe to the local node before a memory line associated the probe is locked.

43. The apparatus of claim 37, wherein the memory access serialization point is a memory controller in the non-local cluster.

44. The apparatus of claim 43, wherein determining if speculative probing can be performed comprises verifying that a memory line associated with the cache access request is not locked.

45. The apparatus of claim 44, further comprising means for receiving a probe originating from a second processor, wherein the probe is associated with the memory line corresponding to the cache access request.

46. The apparatus of claim 45, further comprising means for responding to the probe originating from the second processor using information obtained from the speculative probe of the local node.

47. A method for a cache coherence controller to manage data access in a multiprocessor system, the method comprising:

receiving a cache access request originating from a first cluster of processors including a cache coherence controller and a plurality of processors interconnect in a point-to-point architecture;

sending a probe to nodes associated with the first cluster of processors;

receiving responses to the probe; and sending the cache access request to a second cluster of processors after receiving responses to the probe.

48. The method of claim 47, wherein the cache coherence controller is constructed to act as an aggregate remote cache.

49. The method of claim 47, wherein the cache coherence controller is constructed to act as a probing agent pair.

50. The method of claim 47, wherein the cache coherence controller is constructed to act as a remote memory.

51. The method of claim 47, wherein the cache coherence controller is constructed to act as a remote processor.

* * * * *